United States Patent
Sprague (10) Patent No.: US 7,929,419 B2
(45) Date of Patent: Apr. 19, 2011

(54) METHODS, SYSTEMS, AND COMPUTER PROGRAM PRODUCTS FOR INHIBITING MESSAGE TRAFFIC TO AN UNAVAILABLE TERMINATING SIP SERVER

(75) Inventor: David M. Sprague, Raleigh, NC (US)

(73) Assignee: Tekelec, Morrisville, NC (US)

( * ) Notice: Subject to any disclaimer, the term of this patent is extended or adjusted under 35 U.S.C. 154(b) by 339 days.

(21) Appl. No.: 11/510,284

(22) Filed: Aug. 25, 2006

(65) Prior Publication Data

US 2008/0056234 A1    Mar. 6, 2008

Related U.S. Application Data (60) Provisional application No. 60/835,487, filed on Aug. 4, 2006.

(51) Int. Cl.
*H04L 12/56* (2006.01)

(52) U.S. Cl. ........ 370/218; 370/389; 709/201; 709/220; 709/239

(58) Field of Classification Search .................. None
See application file for complete search history.

(56) References Cited

U.S. PATENT DOCUMENTS

| | | | |
|---|---|---|---|
| 5,371,852 A | 12/1994 | Attanasio et al. | |
| 5,710,885 A | 1/1998 | Bondi | |
| 5,719,861 A | 2/1998 | Okanoue | |
| 5,870,455 A | 2/1999 | Campbell et al. | |
| 5,937,343 A | 8/1999 | Leung | |
| 6,058,116 A | 5/2000 | Hiscock et al. | |
| 6,088,721 A | 7/2000 | Lin et al. | |
| 6,105,034 A | 8/2000 | Buckler | |
| 6,331,983 B1 | 12/2001 | Haggerty et al. | |
| 6,366,577 B1 | 4/2002 | Donovan | |
| 6,385,198 B1 | 5/2002 | Ofek et al. | |
| 6,404,746 B1 | 6/2002 | Cave et al. | |
| 6,421,674 B1 | 7/2002 | Yoakum et al. | |
| 6,434,143 B1 | 8/2002 | Donovan | |
| 6,446,127 B1 | 9/2002 | Schuster et al. | |
| 6,564,261 B1 | 5/2003 | Gudjonsson et al. | |
| 6,601,099 B1 | 7/2003 | Corneliussen | |
| 6,615,236 B2 | 9/2003 | Donovan et al. | |

(Continued)

FOREIGN PATENT DOCUMENTS

JP    2006-279805 A    10/2008

(Continued)

OTHER PUBLICATIONS

Amendment A for U.S. Appl. No. 11/065,900 (Mar. 31, 2008).

(Continued)

*Primary Examiner* — Daniel J Ryman
*Assistant Examiner* — Brian Roberts
(74) *Attorney, Agent, or Firm* — Jenkins, Wilson, Taylor & Hunt, P.A.

(57) ABSTRACT

Methods, systems, and computer program products for inhibiting message traffic to an unavailable terminating SIP server are disclosed. According to one method, at least one list of SIP servers accessible by a call session control function (CSCF) is maintained at an originating CSCF. The list includes at least one of availability and unavailability status information for the terminating SIP servers. A request is received to contact a destination via a one of the terminating SIP servers. The list is indexed and a first terminating SIP server is identified. If the first terminating SIP server is determined to be unavailable based on information in the list, a second terminating SIP server is identified using the list.

19 Claims, 9 Drawing Sheets

U.S. PATENT DOCUMENTS

| | | | |
|---|---|---|---|
| 6,625,141 | B1 | 9/2003 | Glitho et al. |
| 6,636,596 | B1 | 10/2003 | Gallant et al. |
| 6,650,901 | B1 | 11/2003 | Schuster et al. |
| 6,665,702 | B1 | 12/2003 | Zisapel et al. |
| 6,728,748 | B1 | 4/2004 | Mangipudi et al. |
| 6,735,291 | B1 | 5/2004 | Schmid et al. |
| 6,738,390 | B1 | 5/2004 | Xu et al. |
| 6,757,732 | B1 | 6/2004 | Sollee et al. |
| 6,779,039 | B1 | 8/2004 | Bommareddy et al. |
| 6,839,752 | B1 | 1/2005 | Miller et al. |
| 6,857,021 | B1 | 2/2005 | Schuster et al. |
| 6,914,900 | B1 | 7/2005 | Komatsu et al. |
| 6,937,563 | B2 | 8/2005 | Preston et al. |
| 6,992,994 | B2 | 1/2006 | Das et al. |
| 7,020,707 | B2 | 3/2006 | Sternagle |
| 7,028,092 | B2 | 4/2006 | MeLampy et al. |
| 7,054,272 | B1 | 5/2006 | Noel et al. |
| 7,134,011 | B2 | 11/2006 | Fung |
| 7,286,521 | B1 | 10/2007 | Jackson et al. |
| 7,308,499 | B2 * | 12/2007 | Chavez ............ 709/226 |
| 7,631,093 | B2 | 12/2009 | Sternagle |
| 2001/0021173 | A1 | 9/2001 | Oohashi et al. |
| 2001/0039585 | A1 * | 11/2001 | Primak et al. ............ 709/228 |
| 2002/0075844 | A1 | 6/2002 | Hagen |
| 2002/0075880 | A1 | 6/2002 | Dolinar et al. |
| 2002/0080807 | A1 | 6/2002 | Lind |
| 2002/0110113 | A1 | 8/2002 | Wengrovitz |
| 2002/0145975 | A1 | 10/2002 | MeLampy et al. |
| 2002/0176404 | A1 | 11/2002 | Girard |
| 2003/0086410 | A1 | 5/2003 | Eikkula |
| 2004/0088424 | A1 * | 5/2004 | Park et al. .............. 709/229 |
| 2004/0114744 | A1 | 6/2004 | Trossen |
| 2004/0158606 | A1 | 8/2004 | Tsai |
| 2004/0205190 | A1 | 10/2004 | Chong et al. |
| 2005/0147087 | A1 | 7/2005 | Sternagle |
| 2005/0157707 | A1 | 7/2005 | Sternagle |
| 2005/0207402 | A1 | 9/2005 | Kobayashi et al. |
| 2005/0227685 | A1 | 10/2005 | Costa Requena et al. |
| 2006/0010321 | A1 | 1/2006 | Nakamura et al. |
| 2006/0069776 | A1 * | 3/2006 | Shim et al. ............. 709/225 |
| 2006/0101143 | A1 | 5/2006 | Garcia et al. |
| 2007/0156909 | A1 | 7/2007 | Osborn et al. |
| 2007/0191004 | A1 * | 8/2007 | Yamakawa et al. ......... 455/433 |
| 2008/0280623 | A1 * | 11/2008 | Danne et al. .............. 455/453 |
| 2009/0040923 | A1 | 2/2009 | Bantukul et al. |
| 2009/0268723 | A1 | 10/2009 | Przybysz |

FOREIGN PATENT DOCUMENTS

| | | |
|---|---|---|
| KR | 10-2004-0057858 A | 7/2004 |
| KR | 10-2005-0002335 A | 1/2005 |
| KR | 10-2006-0025869 A | 3/2006 |
| WO | WO 00/69140 | 11/2000 |
| WO | WO 01/13228 A2 | 2/2001 |
| WO | WO 02/97653 A1 | 2/2002 |
| WO | WO 2009/018418 A2 | 2/2009 |

OTHER PUBLICATIONS

Notification of Transmittal of the International Search Report and the Written Opinion of the International searching Authority, or the Declaration for International Application No. PCT/US07/17329 (Feb. 15, 2008).
Office Action for U.S. Appl. No. 11/065,876 (Nov. 16, 2007).
Office Action for European Application No. 02 734 585.9-2413 (Aug. 29, 2007).
Supplementary European Search Report for European Applicaion No. 02734585.9-2413 (Jun. 11, 2007).
Office Action for U.S. Appl. No. 11/065,876 (Feb. 8, 2007).
Office Action for U.S. Appl. No. 09/867,879 (Dec. 15, 2004).
Rosenberg, "SIP Proxies," www.dynamicsoft.com, pp. 1-30 (Jul. 2000).
Wiesmann et al., "Understanding Replication in Databases and Distributed Systems," IEEE, pp. 464-474 (Apr. 10, 2000).
Wang et al., "A Signaling System Using Lightweight Call Sessions," IEEE, pp. 697-706 (Mar. 26, 2000).
Gribble et al., "The MultiSpace: an Evolutionary Platform for Infrastructural Services," The University of California at Berkeley, pp. 157-170 (Jun. 6, 1999).
Handley et al., "SIP: Session Initiation Protocol," IETF RFC 2543, pp. 1.
Handley et al., "SDP: Session Description Protocol," IETF RFC 2327, pp. 1.
S. Paul et al., "Reliable Multicast Transport Protocol (RMTP)," IEEE Journal on Selected Areas in Communications, vol. 15, No. 3, pp. 407.
Lin et al., "A Reliable Multicast Transport Protocol," IEEE INFOCOM, pp. 1414.
Office Action for U.S. Appl. No. 11/065,900 (Aug. 5, 2008).
Commonly-assigned, co-pending U.S. Appl. No. 12/183,406 for "Systems, Methods, and Computer Program Products for Distributing Application or Higher Layer Communications Network Signaling Entity Operational Status Information Among Session Initiation Protocol (SIP) Entities," (Unpublished, filed Jul. 31, 2008).
Official Action for U.S. Appl. No. 11/065,876 (May 30, 2008).
Interview Summary for U.S. Appl. No. 11/065,876 (Apr. 11, 2008).
Interview Summary for U.S. Appl. No. 11/065,900 (Apr. 1, 2008).
Office Action for U.S. Appl. No. 11/065,900 (Oct. 31, 2007).
Notice of Allowance and Fee(s) Due for U.S. Appl. No. 09/867,879 (Jan. 3, 2006).
Official Action for U.S. Appl. No. 09/867,879 (Jun. 17, 2005).
A. B. Roach, "Session Initiation Protocol (SIP)-Specific Event Notification," dynamicsoft, Network Working Group, pp. 1-38 (Jun. 2002).
Final Official Action for U.S. Appl. No. 11/065,876 (Mar. 2, 2009).
Notification of Transmittal of the International Search Report and the Written Opinion of the International Searching Authority, or the Declaration for International Application No. PCT/US2008/071718 (Jan. 28, 2009).
Final Official Action for U.S. Appl. No. 11/065,900 (Apr. 20, 2009).
Official Action for U.S. Appl. No. 11/065,900 (Oct. 14, 2009).
Notice of Allowance for U.S. Appl. No. 11/065,876 (Sep. 9, 2009).
Interview Summary for U.S. Appl. No. 11/065,900 (Sep. 4, 2009).
European Search Report for European application No. 02734585.9 (May 23, 2007).
Notification of Transmittal of Ther International Search Report or the Declaration for International Application No. PCT/US02/16915 (Sep. 5, 2002).
Notice of Allowance and Fee(s) Due for U.S. Appl. No. 12/183,406 (Feb. 12, 2010).
"Link Aggregation," IEEE Standard for Local and Metropolitan Area Networks, IEEE Std. 802.1AX, pp. 1-163 (Nov. 3, 2008).

* cited by examiner

| DOMAIN IDENTIFER | GLOBAL SERVER LIST | | | |
|---|---|---|---|---|
| P-CSCF1.OP.COM | P1 | P2 | P3 | P4 |
| I-CSCF1.OP.COM | I1 | I2 | I3 | - |

| ACCESSIBLE SERVER | IP ADDRESS |
|---|---|
| I-CSCF1 I1 | 22.94.128.1 |
| I-CSCF1 I2 | 22.94.128.2 |
| I-CSCF1 I3 | 22.94.128.3 |

| ACCESSIBLE SERVER | STATUS | RETRY INTERVAL |
|---|---|---|
| I-CSCF1 I2 | CONGESTED | 2 SECONDS |
| I-CSCF1 I3 | FAILED | 30 SECONDS |

METHODS, SYSTEMS, AND COMPUTER PROGRAM PRODUCTS FOR INHIBITING MESSAGE TRAFFIC TO AN UNAVAILABLE TERMINATING SIP SERVER

RELATED APPLICATIONS

This application claims the benefit of U.S. Provisional Patent Application Ser. No. 60/835,487, filed Aug. 4, 2006; the disclosure of which is incorporated herein by reference in its entirety.

TECHNICAL FIELD

The subject matter described herein relates to management of message traffic distribution and processing among a plurality of terminating servers. More particularly, the subject matter described herein relates to methods, systems, and computer program products for forwarding or inhibiting message traffic to an unavailable terminating SIP server.

BACKGROUND

The IP multimedia subsystem (IMS) is a new type of network through which multimedia communications can be established between users and between users and applications. In the IMS network, session initiation protocol or SIP is the signaling protocol used to establish communication sessions. The entities involved in establishing a communication session in an IMS network include call session control functions (CSCFs) that communicate with each other using the SIP protocol.

One problem with the conventional call setup scenarios in an IMS network occurs when a terminating SIP server or call session control function becomes unavailable. When an originating SIP server or call session control function receives a request to establish a communication, the originating SIP server may attempt to contact a terminating SIP server. If the terminating SIP server is unavailable, the originating SIP server may be required to wait for a timeout period defined by SIP call processing before attempting to contact an alternate server. The originating SIP server typically does not store state information for terminating SIP servers. As a result, when a second communication setup request arrives at the originating SIP server, the originating SIP server may again attempt to contact the failed terminating SIP server. Repeated attempts to contact a failed terminating SIP server and the associated time out periods waste resources of the originating SIP server and delay call establishment.

Accordingly, in light of these difficulties, there exists a need for methods, systems, and computer program products for inhibiting message traffic to an unavailable terminating SIP server.

SUMMARY

Methods, systems, and computer program products for inhibiting message traffic to an unavailable terminating SIP server are disclosed. According to one method, at least one list of SIP servers accessible by a call session control function (CSCF) is maintained at an originating CSCF. The list includes at least one of availability and unavailability status information for the terminating SIP servers. A request is received to contact a destination accessible via a one of the terminating SIP servers. The list is indexed and a first terminating SIP server is identified. If the first terminating SIP server is determined to be unavailable based on information in the list, a second terminating SIP server is identified using the list.

As used herein, the term "available server" refers to a message server with sufficient operating capacity to accept and process new messages. As used herein, the term "unavailable server" refers to a message server that has either failed or has entered a processing overload state and consequently is not capable of accepting and processing a new message.

As used herein, the term "normal status" refers to the operating status of an available terminating SIP message server.

As used herein, the term "congested status" refers to the operating status of an unavailable terminating SIP message server that, while operational, does not have sufficient internal resources to accept and process a new message.

As user herein, the term "failed status" refers to the operating status of an unavailable terminating SIP message server that has failed to properly receive, process, and provide a valid status response in response to a received message.

As used herein, the term "S-CSCF" refers to an IMS serving call session control function. The S-CSCF function may maintain a list of registered user equipment, associated status information, and associated capabilities.

As user herein, the term "I-CSCF" refers to an IMS interrogating call session control function. The I-CSCF function may provide a terminating subscriber location function for a message received from a P-CSCF server and forward the received message to either a S-CSCF server in the network or to an message server in an adjacent network though a network interconnect function.

As used herein, the term "P-CSCF" refers to an IMS proxy call session control function. The P-CSCF function may process a message received from a SIP device and forward the processed message to an I-CSCF server in the network. Processing the message may include compressing and/or encrypting the received message.

As used herein, the term "CSCF" refers to an IMS call session control function that implements any one or more of the above referenced S-CSCF, I-CSCF, or P-CSCF functions.

As used herein, the term "server list" refers to a list of terminating SIP message servers to which an originating SIP message server may forward message traffic. The server list may be stored at the originating SIP message server in any format suitable to the originating server.

As used herein, the term "server exception list" refers to a list including one or more unavailable terminating SIP message servers, as detected by an originating SIP message server in response to forwarding a first message. The server exception list may be stored at the originating SIP message server in any format suitable to the originating server.

As used herein, the term "originating SIP server" refers to any SIP server capable of performing an IMS function. An originating SIP server may be an S-CSCF, an I-CSCF, or a P-CSCF.

As used herein, the term "terminating SIP server" refers to any SIP server capable of performing an IMS function, including any of an S-CSCF, an I-CSCF, or a P-CSCF.

The subject matter described herein may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer-readable medium that implements the subject matter described herein may be located on a single device or computing platform or may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
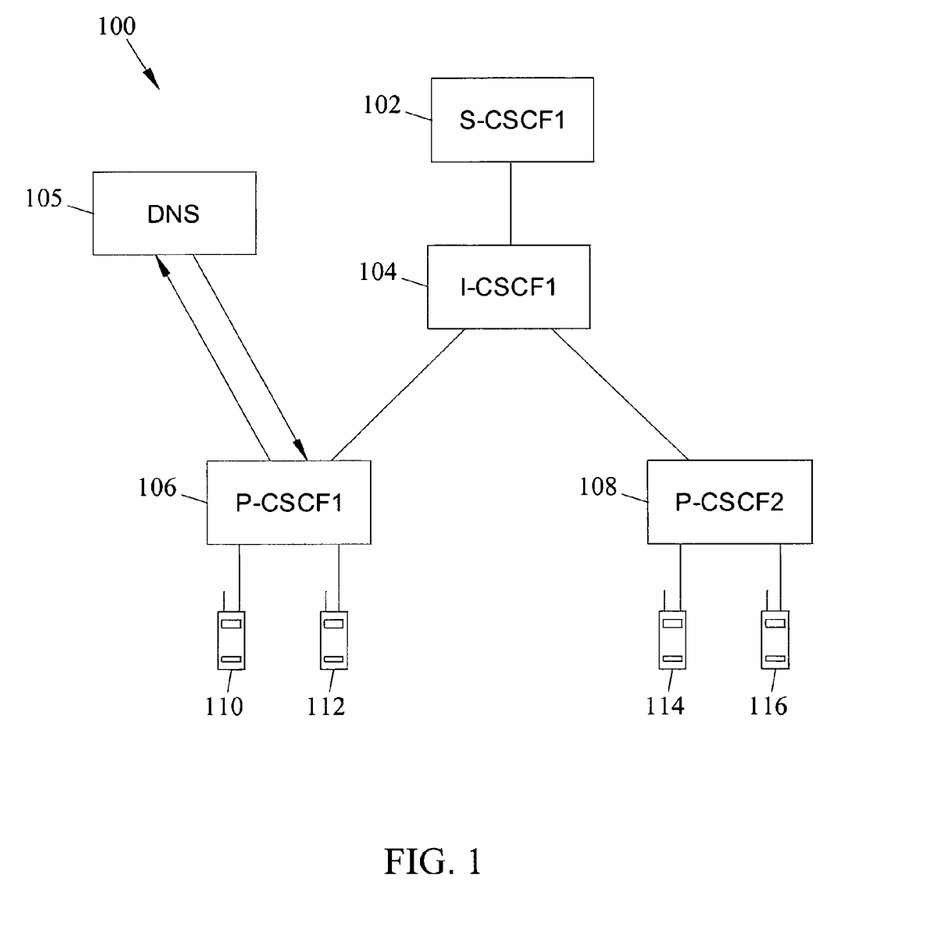
FIG. 1 is a block diagram of an exemplary SIP/IMS call processing architecture in which embodiments of the subject matter described herein may be implemented.

In view of the problems described above, the subject matter described herein provides methods for forwarding or inhibiting message traffic to a terminating SIP server. FIG. 1 illustrates an SIP/IMS call processing architecture 100 in which embodiments of the subject matter described herein may be implemented. In FIG. 1, SIP/IMS call processing architecture 100 includes a plurality of SIP/IMS call control elements, including a serving call session control function (S-CSCF) server cluster S-CSCF1 102, an interrogating call session control function (I-CSCF) server cluster I-CSCF1 104, a DNS server 105 and a plurality of proxy call session control function (P-CSCF) server clusters P-CSCF1 106 and P-CSCF2 108. P-CSCF1 106 and P-CSCF2 108 may provide control interface and message transfer operations for a plurality of SIP devices 110-116. SIP devices may be any user equipment capable of establishing multimedia sessions using SIP, including mobile and fixed terminals.

In order to establish a communication, an originating SIP device 110 may send a request message to P-CSCF1 106. P-CSCF1 106 may query DNS server 105 to identify the IP address corresponding to an I-CSCF, which represents the point of contact into the destination subscriber's network. DNS server 105 may return the identifier or IP address of more than one I-CSCF server in an I-CSCF cluster. Rather than blindly contacting each server until an available server is located, a P-CSCF server according to an embodiment of the subject matter described herein may store at least one of availability and unavailability information for SIP servers that it is capable of contacting and may use this information to inhibit the forwarding of message traffic to unavailable servers.

Figure 2:
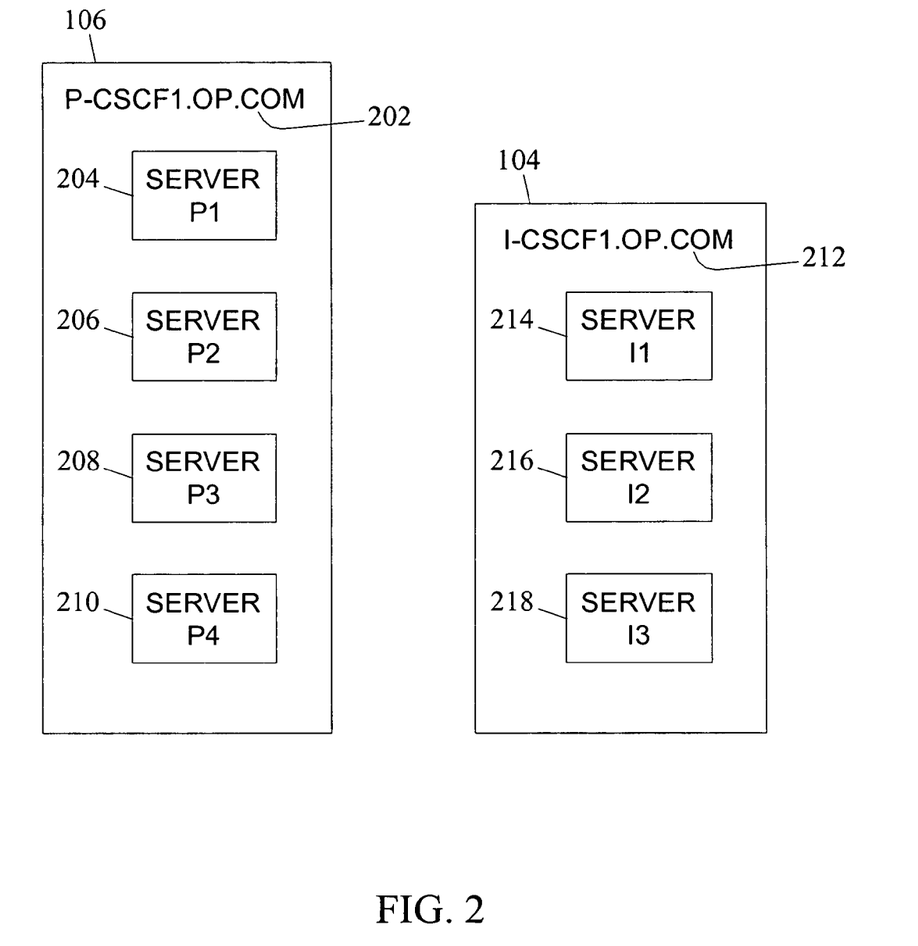
FIG. 2 is a block diagram of an exemplary P-CSCF server cluster and an exemplary I-CSCF server cluster according to an embodiment of the subject matter described herein.

FIG. 2 illustrates an exemplary P-CSCF server cluster 106 and an exemplary I-CSCF server cluster 104 according to an embodiment of the subject matter described herein. In FIG. 2, P-CSCF1 server cluster 106 may include a network identifier 202 and a plurality of P-CSCF servers P1 204, P2 206, P3 208, and P4 210. Each server may be operable to implement P-CSCF functions for SIP/IMS call processing architecture 100, including message compression and/or message security encryption.

P-CSCF1 server cluster 106 may include one or more servers 204, 206, 208, and 210 that are operable to perform IMS proxy CSCF functions, such as serving as the point of contact for user equipment in an IMS network. A server in P-CSCF1 server cluster 106 not designated as active may be placed in a standby state, ready to process one or more SIP messages in the future. For example, servers P1 204, P2 206, and P3 208 may be configured as active, with server P4 210 configured in a standby state. P-CSCF1 server cluster 106 may transition server P4 210 to the active state in response to one of the active servers P1 204, P2 206, or P3 208 becomes unavailable.

I-CSCF1 server cluster 104 may include a network identifier 212 and a plurality of servers I1 214, I2 216, and I3 218. Each server may be operable to implement I-CSCF functions for SIP/IMS call processing architecture 100, including providing a terminating subscriber location function.

Servers 214, 216, and 218 may be active and operable to process SIP messages received from either P-CSCF1 server cluster 106 or S-CSCF1 server cluster 102. A server in I-CSCF1 server cluster 104 not designated to be active may be placed in a standby state, ready to process one or more SIP messages in the future. I-CSCF1 server cluster 104 may distribute message processing tasks among the active servers in the cluster using a suitable load balancing algorithm.

Figure 3A:
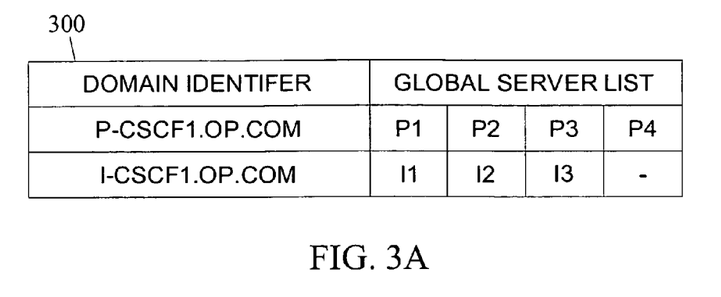
FIG. 3A is a diagram of an exemplary global server list that may be maintained by a DNS server in a SIP/IMS call processing architecture according to an embodiment of the subject matter described herein.

FIG. 3A illustrates an exemplary global server list 300 that may be maintained by DNS server 105 for the servers illustrated in FIG. 2. In FIG. 3A, global server list 300 may include a list of server clusters in SIP/IMS call processing architecture 100 with a list of servers configured in each cluster. For example, list 300 may include one or more P-CSCF server clusters, one or more I-CSCF server clusters, and one or more S-CSCF server clusters, each identified with a suitable domain name identifier. A copy of global list 300 may be stored at each server cluster and/or in a central server in SIP/IMS call processing architecture 100, using any format compatible with the server storing the table.

Figure 3B:
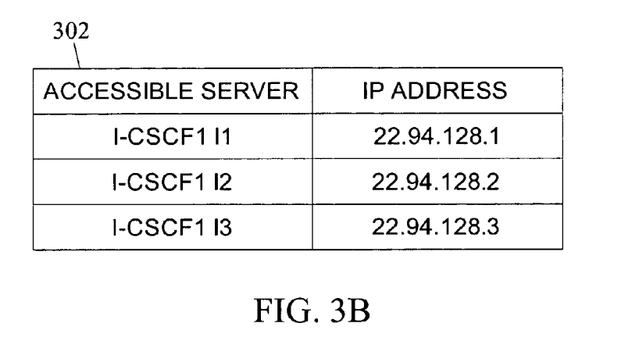
FIG. 3B is a diagram of an exemplary server list that may be maintained by a CSCF according to an embodiment of the subject matter described herein.

According to another aspect, each P-CSCF server illustrated in FIG. 1 may maintain a list of terminating SIP servers through which call destinations may be reached. FIG. 3B illustrates an exemplary terminating server list 302 that may be maintained by a P-CSCF according to an embodiment of the subject matter described herein. In FIG. 3B, server list 302 may include an entry for each terminating server that the originating server is capable of accessing in SIP/IMS call processing architecture 100 and may further include an IP address or other network identifier suitable to SIP/IMS call processing architecture 100 for each terminating server in the server list. For example, P-CSCF server P1 204 may store a server list 302 including I-CSCF servers I1 214, I2 216, and I3 218 in I-CSCF1 server cluster 104.

Figure 3C:
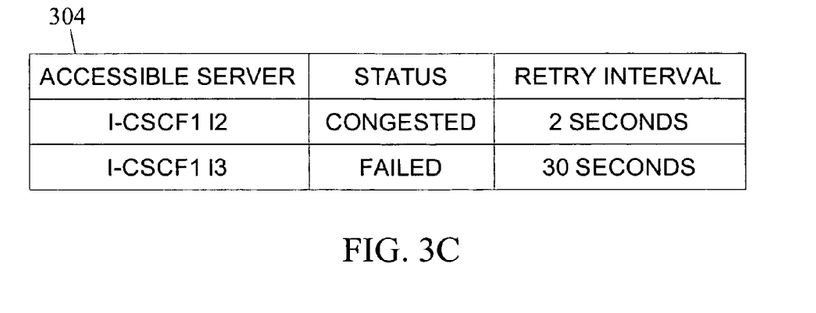
FIG. 3C is a diagram of an exemplary server exception list that may be maintained by a CSCF according to an embodiment of the subject matter described herein.

According to yet another aspect of the subject matter described herein, each P-CSCF server may maintain an exception list including servers accessible by the P-CSCF server that are currently unavailable. FIG. 3C illustrates an exemplary server exception list 304 that may be maintained by a P-CSCF according to an embodiment of the subject matter described herein. In FIG. 3C, server exception list 304 may include a list of accessible servers identified in server list 302 that are currently unavailable. Each entry in server exception list 304 may include an identifier for the unavailable server, a status indication, and a retry interval value. The status indication stored in server exception list 304 may be of any form suitable to the originating SIP message server. For example, the status indication may be SIP status response code 503, representing a congested terminating server, or SIP status response code 408, representing a failed terminating server. The retry interval may be a time period after which an originating server can reattempt to contact the failed terminating server. After the retry interval, the entry may age out of server exception list 304. Server exception list 304 may be stored in a database maintained by the originating P-CSCF.

Figure 4:
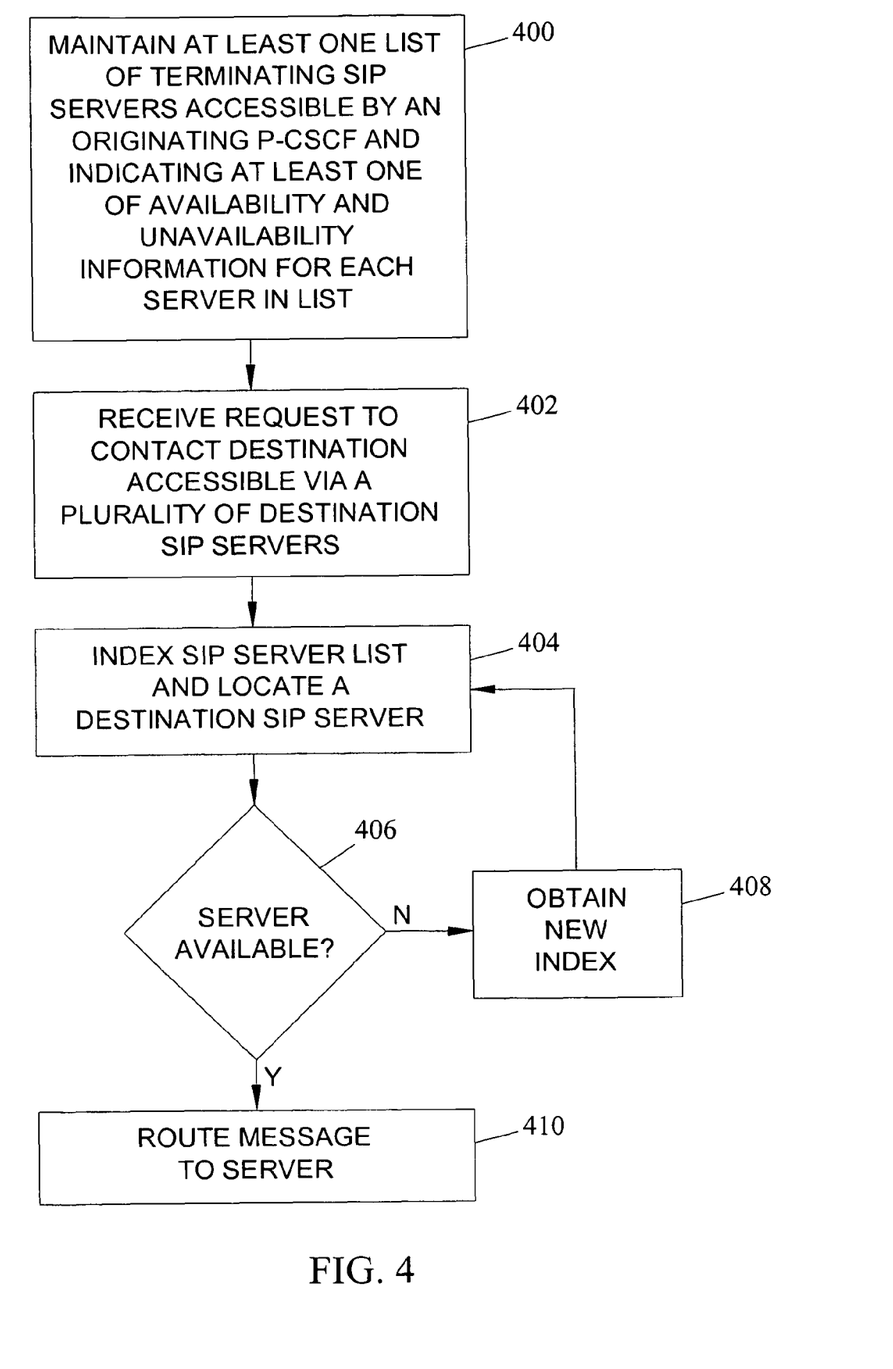
FIG. 4 is a flow chart of an exemplary process for inhibiting message traffic to an unavailable terminating SIP message server according to an embodiment of the subject matter described herein.

FIG. 4 is a flow chart illustrating an exemplary process for inhibiting message traffic to an unavailable terminating SIP server using a server exception list according to an embodiment of the subject matter described herein. Referring to FIG. 4, in step 400, at least one list of terminating SIP servers accessible by a P-CSCF is maintained. The list indicates at least one of availability and unavailability information for each server in the list. Step 400 may be performed by a P-CSCF server, such as P-CSCF server P1 204 illustrated in FIG. 2. In response to call setup requests during normal call processing, P-CSCF server P1 204 may send SIP request messages to each terminating server, such as an I-CSCF, that it is capable of contacting. Exemplary SIP request messages include an INVITE message, an ACK message, a BYE message, a CANCEL message, an OPTIONS message, and a REGISTER message. If the destination server responds with a SIP 503 or SIP 408 retry message, P-CSCS server P1 204 may determine that the server is unavailable and may mark the status of the server as unavailable in its exception list. As stated above, entries may age out of exception list based on the retry interval associated with an exception list. Once an entry ages out of the exception list, the corresponding server can be retried for normal communications. The request messages used to build the exception list may be generated in response to normal communications between originating and terminating parties. In an alternate implementation, each terminating SIP server may communicate heartbeat messages with the P-CSCF at predetermined time intervals. Failure to receive a heartbeat message within a predetermined time interval may cause the P-CSCF mark a terminating SIP server as unavailable.

In step 402, the originating P-CSCF server receives a request to contact a destination accessible via one or more destination SIP servers. In step 404, P-CSCF P1 204 indexes the SIP server list and locates a destination SIP server to which the communication should be directed. Step 404 may be performed using any suitable indexing method. In one example, step 404 may include randomly indexing a SIP server list corresponding to a destination. In an alternate implementation, SIP servers may be contacted according to a predetermined order of preference, as will be described in more detail below.

In step 406, P-CSCF P1 204 determines whether the server is available. Step 406 may be accomplished by reading the status information for the SIP server in the list. If the server is not available, control proceeds to step 408 where a new index is computed, and steps 404 and 406 are repeated to contact the new server. If the server is available, control proceeds to step 410 where the message is routed to the server.

Thus, in the example illustrated in FIG. 4, rather than blindly sending messages to unavailable SIP servers and waiting for timeouts, server availability or unavailability status is stored and used to immediately determine whether a proposed terminating server is unavailable. If the terminating server is unavailable, an alternate server can be selected without requiring communication with the unavailable server. These steps are believed to significantly reduce connection establishment time over implementations where a communication timeout is required to trigger reindexing of a SIP server list.

Figure 5:
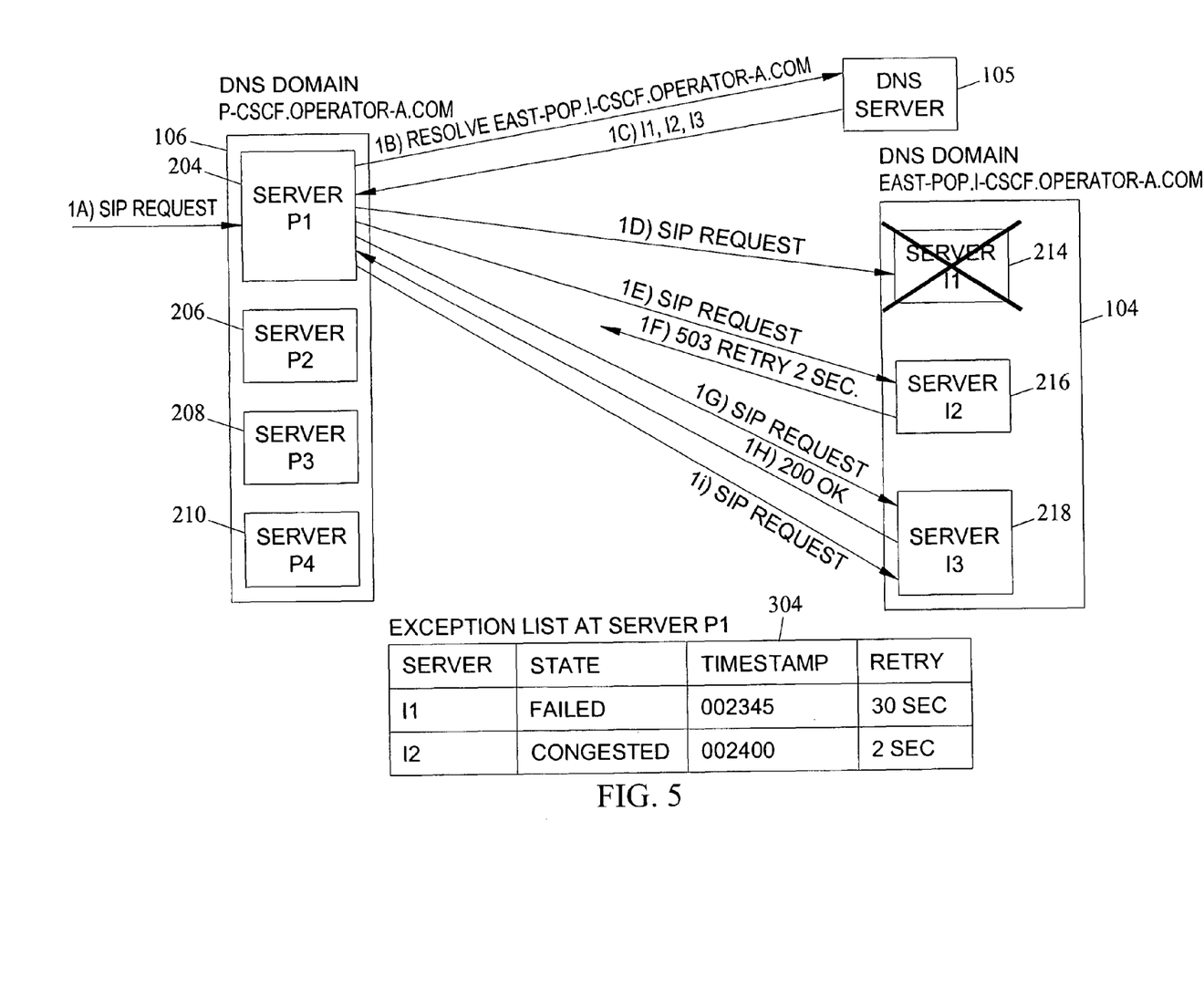
FIG. 5 is a block diagram illustrating an exemplary method for inhibiting routing of messages to unavailable terminating SIP servers using a server exception list according embodiment of the subject matter described herein.

FIG. 5 is a network diagram illustrating a message routing example according to an embodiment of the subject matter described herein. Referring to FIG. 5, P-CSCF server P1 204 receives a SIP request message. The SIP request message may originate from another domain or from a terminal associated with P-CSCS P1 204. The SIP request message may include the domain EAST-POP.I-CSCF.OPERATOR-A.COM. In this example, it is assumed that server 204 does not cache the corresponding IP address information. Accordingly, server 204 queries DNS server 105 to resolve the domain name. DNS server 105 resolves the domain name into IP addresses for I-CSCF servers I1 214, I2 216, and I3 218.

In this example, it is assumed that server 204 did not previously store status information for servers I1 214, I2 216, and I3 218. Accordingly, server P1 204 sends request messages to servers I1 214, I2 216, and I3 218 to determine their respective statuses. Server I1 214 is unavailable and does not respond. Server I2 216 responds with a retry message indicating that it is congested. Server I3 218 responds with a 200 OK message indicating that it is available. Accordingly, server P1 204 updates exception list 304 to indicate the unavailable of servers I1 214 and I2 216.

Server P1 204 then computes an index into its server list, which includes servers I1 214, server I2 216, and server I3 218. In this example, it is assumed that the first index corresponds to server I1 214. Server P1 204 then determines whether terminating server I1 214 is in the exception list. Because server I1 214 is in the exception list, server P1 214 may refrain from sending message traffic to server I1 214 during its retry interval and compute a new index. In this example, it is assumed that the new index corresponds to server I3 218. Since server I3 218 is not in the exception list, the SIP request message gets routed to server I3 218, as indicated by message 1i in FIG. 5.

Thus, as illustrated in FIG. 5, server unavailability information may be used to reduce the time for completing communications when one or more servers are unavailable. In the example illustrated in FIG. 5, the availability status information of the destination servers is determined in response to a request message received by an originating server. As stated above, in an alternate example, the originating server may store this information in advance of receiving a request, eliminating the need for determining availability status before completing a call. In addition, the timeout period for non-receipt of a response to a status request may be set to less than that of conventional SIP call processing to reduce the time required to determine unavailability of a destination server.

Figure 6:
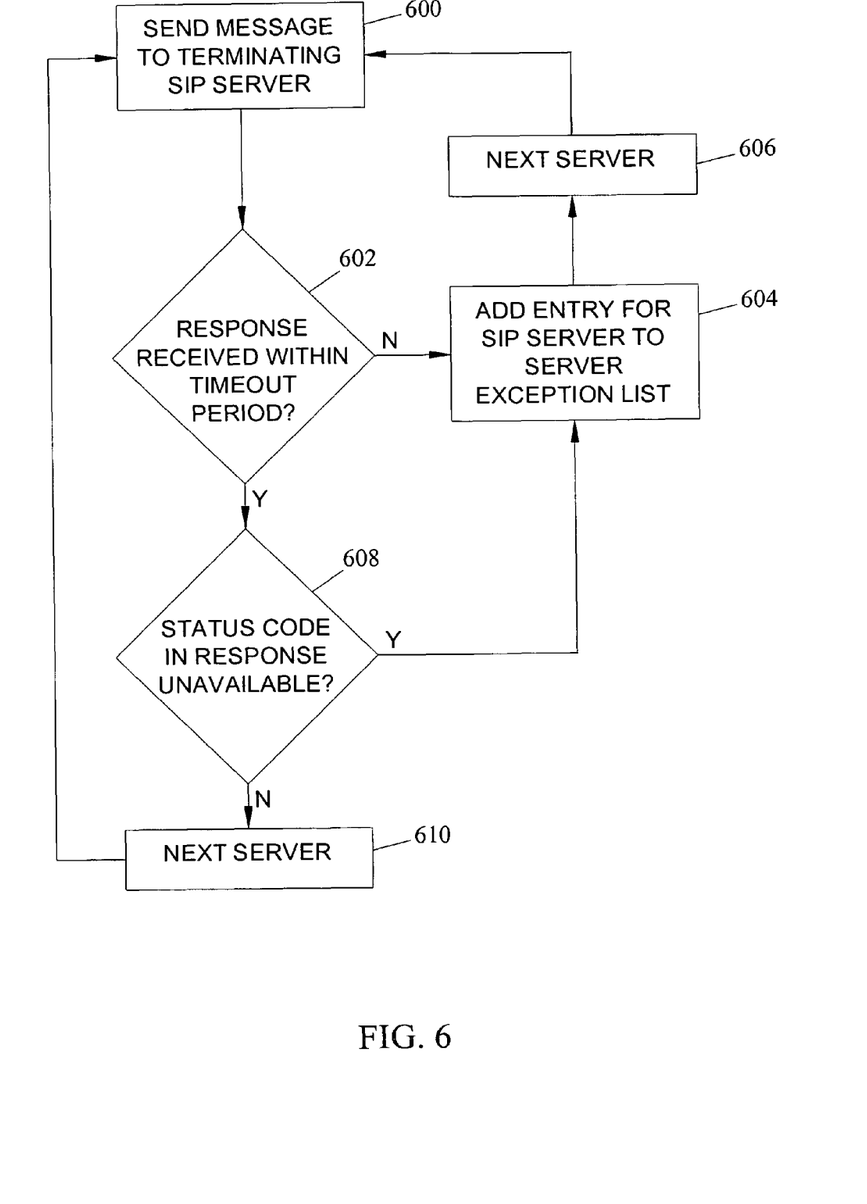
FIGS. 6 and 7 are flow charts illustrating exemplary steps for maintaining a server exception list according to an embodiment of the subject matter described herein.
Figure 7:
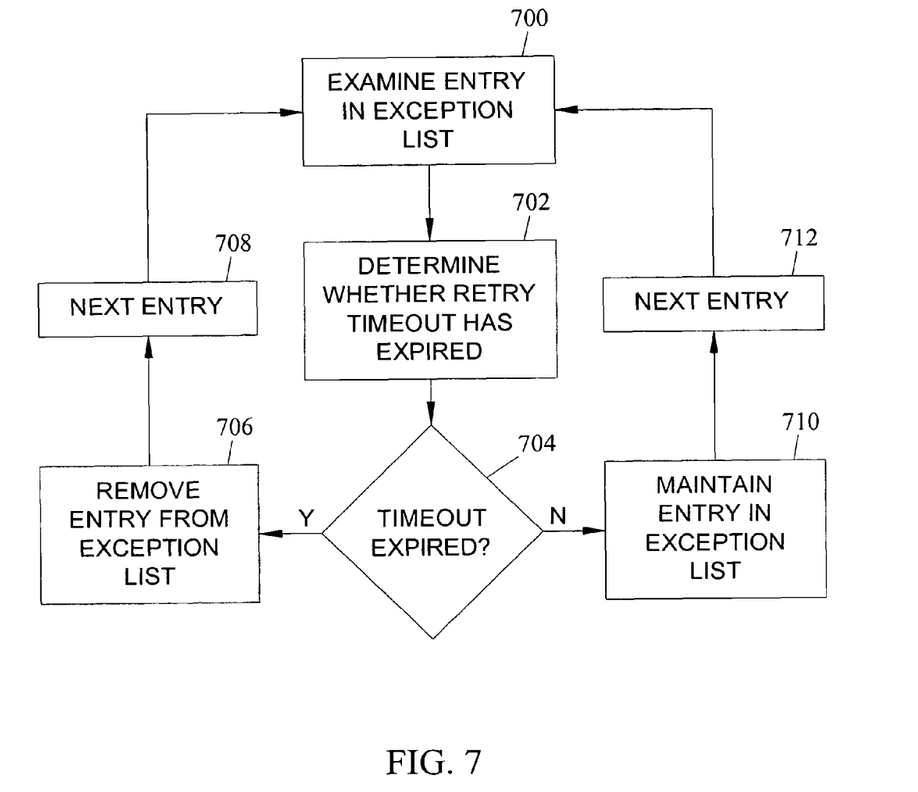

FIGS. 6 and 7 are flow charts illustrating exemplary processes for maintaining a server exception list according to an embodiment of the subject matter described herein. More particularly, FIG. 6 illustrates an exemplary process by which status information is obtained for a terminating SIP server, and FIG. 7 illustrates an exemplary process by which entries are removed from a server exception list according to an embodiment of the subject matter described herein. In FIG. 6, it is assumed that an originating server periodically tests terminating servers with which it has contact. Referring to FIG. 6, in step 600, a message is sent to a terminating SIP server. The message query may be any suitable SIP message, such as a SIP request message. The request message may be a "dummy" message that prompts the terminating SIP server to return its status. In step 602, it is determined whether a response to the message has been received within a timeout period for the query. The timeout period may be set to less than that of conventional SIP call processing to reduce call processing delay. If the timeout period expires before a response is received, control proceeds to step 604 where the entry is added to the server exception list. Control then proceeds to step 606 where the next server maintained in the originating SIP server is exception list is tested. Steps 600-604 may be repeated for the next server.

In step 602, if a response is received within the timeout period, control proceeds to step 608 where it is determined whether the status code in the message indicates that the destination server is unavailable. If the status code indicates that the server is unavailable, control proceeds to step 604 where the server is added to the exception list. Steps 606-608 may be repeated for the next server.

In step 608, if the status code indicates that the server is available, the server is not added to the exception list. Control then proceeds to step 610 where the next server in the server list is determined. Steps 600-608 may then be repeated for the next server.

Referring to FIG. 7, a separate process may execute to determine when to remove entries from the exception list. Referring to FIG. 7, in step 700, an entry in the exception list is examined. In steps 702 and 704, it is determined whether a retry timeout for the entry has expired. The retry timeout may define the time period during which an exception list entry is valid. Once an entry is no longer valid, it may be removed from the exception list. Accordingly, in step 704, if it is determined that the timeout has expired, control proceeds to step 706 where the entry is removed from the exception list. In step 708, the next entry is accessed. Steps 700-706 may be repeated for the next entry.

In step 704, if it is determined that the retry timeout has not expired, control proceeds to step 710, where the entry is maintained in the exception list. Control then proceeds to step 712 where the next entry is accessed. Steps 700-710 may be repeated for the next entry. Thus, using the process of FIG. 7, entries in the exception list are aged out. When considered in combination with the process illustrated in FIG. 6, entries may be added and aged out to maintain a current exception list and to present servers from being maintained perpetually in the exception list.

Although the examples described above illustrate maintaining a server list containing all servers and maintaining a separate exception list, the subject matter described herein is not limited to maintaining two separate lists. A single list that includes both available and unavailable servers may be maintained without departing from the scope of the subject matter described herein.

Figure 8:
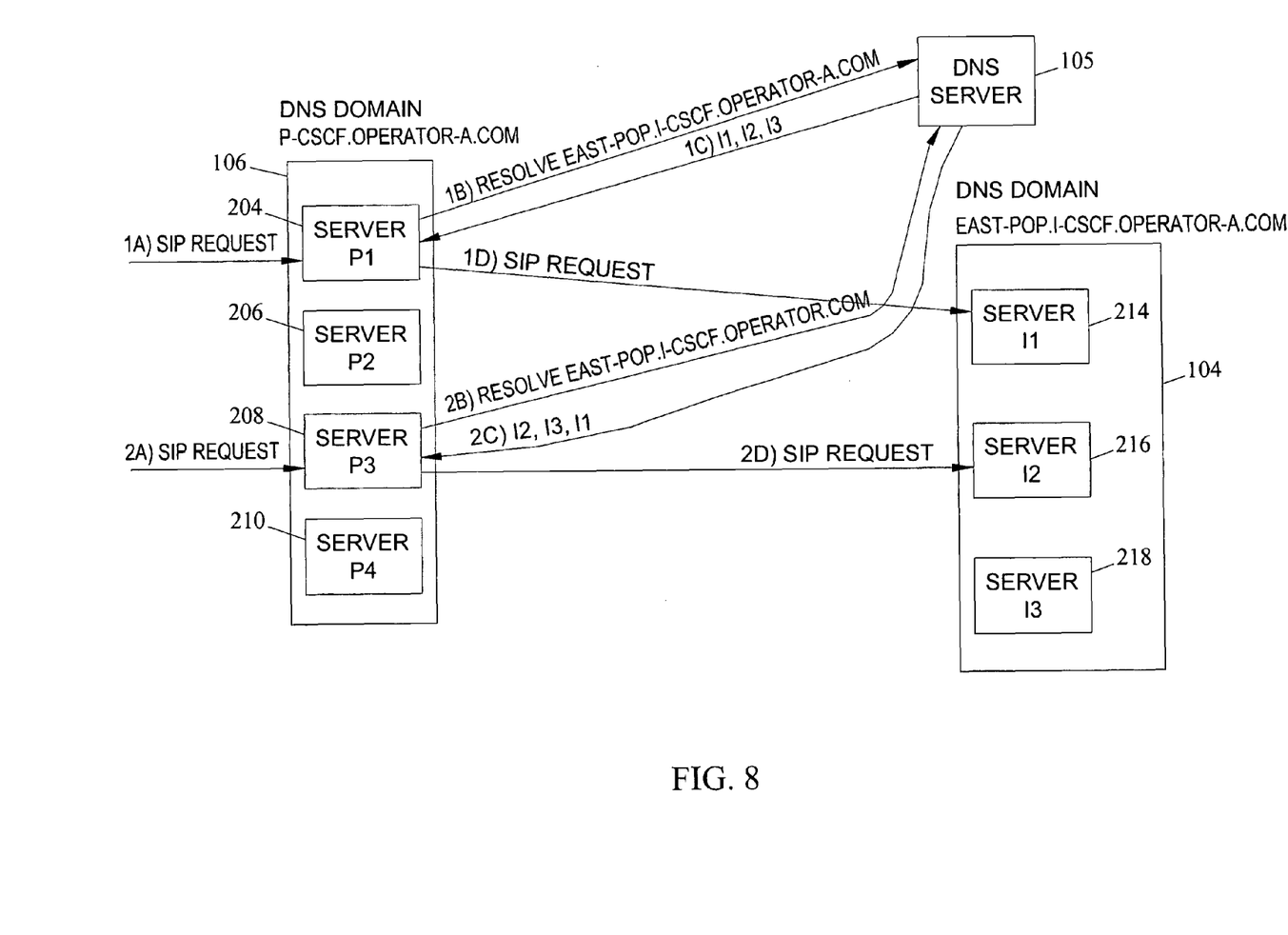
FIG. 8 is a block diagram illustrating an exemplary method for load balancing messages among terminating SIP servers using DNS according to an embodiment of the subject matter described herein.

According to another aspect, the subject matter described herein may include a method for using DNS to load balance among terminating SIP servers. FIG. 8 illustrates this concept. Referring to FIG. 8, a SIP server 204 may initiate a DNS request to resolve the domain name EAST-POP.I-CSCF.OPERATOR-A.COM. In response to the request, DNS server 105 may return IP addresses in the order of I1, I2, I3, representing servers 214, 216, and 218 in order of preference. Server 204 may attempt to contact servers 214, 216, and 218 in the order specified by DNS server 105. Accordingly, in the illustrated example, server P1 204 may contact server I1 214 first, as illustrated by message 1D.

When server P3 208 receives a SIP request message for the same domain, server P3 208 sends a DNS request to DNS server 105. DNS server 105 returns servers I2, I3, and I1 in a different order of preference from that given in response to the previous DNS query by server P1 204. Server P3 208 receives the server contact list and attempts to contact the server of the highest order of preference in the list. In this example, the server of the highest order of preference is server I2 216.

For each successive DNS request, DNS server 105 may return a different order of priority to the requesting server. Since each requesting server uses the order of priority specified by DNS server 105 to contact a terminating server and the order changes, messages will be load balanced equally over time among the destination servers. If one of the destination servers fails and is added to the exception list of the originating servers, messages will be load balanced among the remaining servers.

Figure 9:
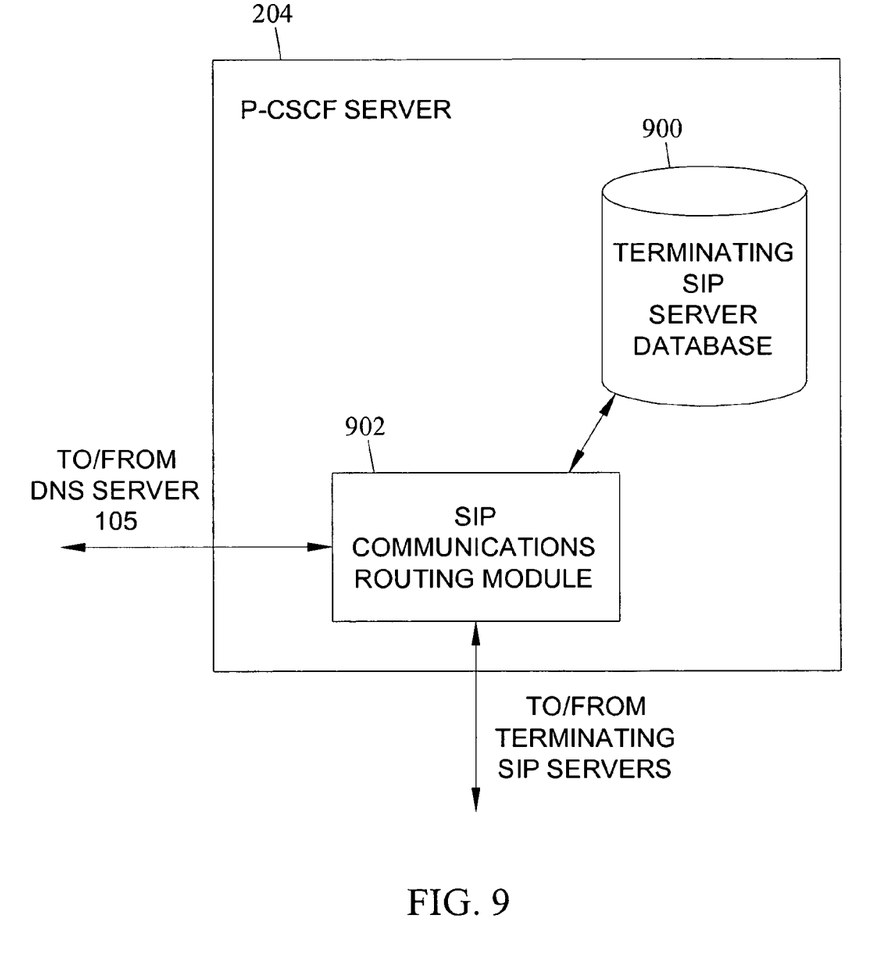
FIG. 9 is a block diagram illustrating an exemplary P-CSCF server that includes a terminating SIP server database according to an embodiment of the subject matter described herein.

FIG. 9 is a block diagram illustrating an exemplary architecture for P-CSCF 204. Referring to FIG. 9, P-CSCF 204 includes a terminating SIP server database 900 for storing the list of available and unavailable SIP servers as described above. P-CSCF 204 may also include a SIP communications routing module 902 for communicating with terminating SIP servers to maintain the availability and/or unavailability status information in database 900. SIP communications routing module 902 may also communicate with DNS server 105 for obtaining IP addresses corresponding to terminating SIP server domain names. SIP communications routing module 902 may also route communications based on information stored in terminating SIP server database 900, as described above.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for forwarding or inhibiting message traffic to a terminating session initiation protocol (SIP) server using a SIP server exception list, the method comprising:

at an originating Internet Protocol (IP) multimedia subsystem (IMS) call session control function (CSCF):
sending status request messages to a plurality of terminating SIP servers to determine their operational statuses, and, in response to failing to receive a response from a terminating SIP server within a timeout period or receiving a response indicating that the terminating SIP server is unavailable, placing the terminating SIP server in an exception list;
receiving a request to contact a destination, the request including a domain name;
querying a domain name system (DNS) server to resolve the domain name and receiving, from the DNS server, a list of IP addresses corresponding to the domain name and identifying terminating SIP servers;
indexing the list of IP addresses received from the DNS server and identifying a first terminating SIP server;

determining whether the first terminating SIP server is in the exception list; and in response to determining that the first terminating SIP server is in the exception list, refraining from sending SIP message traffic to the first terminating SIP server, identifying a second terminating SIP server from the list of IP addresses received from the DNS server, determining that the second terminating SIP server is not in the exception list, and sending a request to the second terminating SIP server.

2. The method of claim 1 comprising updating the exception list based on communications involving the plurality of terminating SIP servers.

3. The method of claim 1 wherein the timeout period for adding a non-responsive terminating SIP server to the exception list is less than that for SIP call processing.

4. The method of claim 1 comprising maintaining a retry timer for each entry in the exception list and removing the entry from the exception list in response to expiration of the retry timer.

5. The method of claim 1 wherein indexing the list of IP addresses received from the DNS server includes randomly indexing the list of IP addresses received from the DNS server.

6. The method of claim 1 wherein indexing the list of IP addresses received from the DNS server includes indexing the list of IP addresses received from the DNS server according to a predetermined order of preference.

7. A system for forwarding or inhibiting message traffic to a terminating session initiation protocol (SIP) server, the system comprising:

an Internet Protocol (IP) multimedia subsystem (IMS) call session control function (CSCF) server, the IMS CSCF server including:

(a) a terminating SIP server database stored in a memory for storing an exception list of terminating SIP servers that are unavailable; and (b) a SIP communications routing module for sending status request messages to a plurality of terminating SIP servers, for, in response to failing to receive a response from a terminating SIP server within a timeout period or receiving a response indicating that the terminating SIP server is unavailable, placing the terminating SIP server in the exception list, for receiving a SIP request message including a domain name, for querying a domain name system (DNS) server to resolve the domain name, for receiving, from the DNS server, a list of IP addresses corresponding to the domain name and identifying terminating SIP servers, for indexing the list of IP addresses received from the DNS server and identifying a first terminating SIP server, for determining whether the first terminating SIP server is in the exception list, for, in response to determining that the first terminating SIP server is in the exception list, refraining from sending SIP message traffic to the first terminating SIP server, for identifying a second terminating SIP server from the list of IP addresses received from the DNS server, for determining the second terminating SIP server is not in the exception list, and for sending a request to the second terminating SIP server.

8. The system of claim 7 wherein the SIP communications routing module is adapted to build the exception list based on information received from the plurality of terminating SIP servers in response to SIP request messages.

9. The system of claim 7 wherein the timeout period used by the SIP communications routing module to add a terminating SIP server to the exception list is less than a SIP call processing timeout.

10. The system of claim 7 wherein the SIP communications routing module is adapted to remove an entry from the exception list in response to expiration of a retry interval for the entry.

11. The system of claim 7 wherein the SIP communications routing module is adapted to randomly index the list of IP addresses received from the DNS server.

12. The system of claim 7 wherein the SIP communications routing module is adapted to access the list of IP addresses received from the DNS server in a predetermined order of preference specified by the DNS server.

13. The system of claim 7 wherein the SIP communications routing module is adapted to route a SIP request message to the first terminating SIP server in response to determining availability of the first terminating SIP server using the terminating SIP server database.

14. A computer program product comprising computer executable instructions embodied in a non-transitory computer readable medium for performing steps comprising:

at an originating Internet Protocol (IP) multimedia subsystem (IMS) call session control function (CSCF):

sending status request messages to a plurality of terminating SIP servers to determine their operational statuses, and, in response to failing to receive a response from a terminating SIP server within a timeout period or receiving a response indicating that the terminating SIP server is unavailable, placing the terminating SIP server in an exception list;

receiving a request to contact a destination, the request including a domain name;

querying a domain name system (DNS) server to resolve the domain name and receiving, from the DNS server, a list of IP addresses corresponding to the domain name and identifying terminating SIP servers;

indexing the list of IP addresses received from the DNS server and identifying a first terminating SIP server;

determining whether the first terminating SIP server is in the exception list; and in response to determining that the first terminating SIP server is in the exception list refraining from sending SIP message traffic to the first terminating SIP server, identifying a second terminating SIP server from the list of IP addresses received from the DNS server, determining that the second terminating SIP server is not in the exception list, and sending a request to the second terminating SIP server.

15. The computer program product of claim 14 comprising updating the exception list based on communications involving the plurality of terminating SIP servers.

16. The computer program product of claim 14 wherein the timeout period for adding a non-responsive terminating SIP server to the exception list is less than that for SIP call processing.

17. The computer program product of claim 14 comprising maintaining a retry timer for each entry in the exception list and removing the entry in response to expiration of the retry timer.

18. The computer program product of claim 14 wherein indexing the list of IP addresses received from the DNS server includes randomly indexing the list of IP addresses received from the DNS server.

19. The computer program product of claim 14 wherein indexing the list of IP addresses received from the DNS server includes indexing the list of IP addresses received from the DNS server according to a predetermined order of preference.

* * * * *